US012748881B2

(12) United States Patent
Ravindranath et al.

(10) Patent No.: US 12,748,881 B2
(45) Date of Patent: Sep. 29, 2026

(54) PRIVACY CHOREOGRAPHER FOR FULLY MANAGED SERVERLESS APPLICATION PLATFORMS

(71) Applicant: Google LLC, Mountain View, CA (US)

(72) Inventors: Radhika Ravindranath, South Plainfield, NJ (US); Jacques Mouton, Tampa, FL (US); James Paul Black, Sunnyvale, CA (US); Dev Narendrabhai Patel, Ahmedabad (IN); Frankie Lamar, Jr., New York, NY (US); Benjamin Steven Kaplan, Los Angeles, CA (US)

(73) Assignee: GOOGLE LLC, Mountain View, CA (US)

( * ) Notice: Subject to any disclaimer, the term of this patent is extended or adjusted under 35 U.S.C. 154(b) by 147 days.

(21) Appl. No.: 18/584,414

(22) Filed: Feb. 22, 2024

(65) Prior Publication Data

US 2025/0272426 A1 Aug. 28, 2025

(51) Int. Cl.
*G06F 21/00* (2013.01)
*G06F 21/62* (2013.01)

(52) U.S. Cl.
CPC ...... *G06F 21/6227* (2013.01); *G06F 21/6263* (2013.01)

(58) Field of Classification Search
None
See application file for complete search history.

(56) References Cited

U.S. PATENT DOCUMENTS 9,015,832 B1 * 4/2015 Lachwani ............... G06F 21/52 726/22
11,277,431 B2 3/2022 Trivellato et al.
11,755,717 B2 * 9/2023 Geiger ................ G06F 21/6209 726/1
11,861,044 B2 * 1/2024 Schroeder ............. G06F 18/217
2015/0040237 A1 * 2/2015 Vandervort ......... G06F 21/6254 726/26
2021/0185077 A1 * 6/2021 Shavlik ............... H04L 63/1433
2021/0297315 A1 * 9/2021 Harvesf .............. H04L 41/0894
2022/0222363 A1 * 7/2022 Rupawalla .............. G06F 21/31
2023/0113956 A1 * 4/2023 Lal ...................... G06F 21/6218 726/26
2023/0185939 A1 * 6/2023 Cam-Winget ........ G06F 21/123 726/1

* cited by examiner

*Primary Examiner* — Maung T Lwin
(74) *Attorney, Agent, or Firm* — DORITY & MANNING, P.A.

(57) ABSTRACT

Example embodiments of the present disclosure provide for an example method including receiving, from privacy agents deployed by an agent deployment engine, system metric data. The system metric data can include signals associated with compute resources based on settings or functions of a respective compute resource of the compute resources. The method can include generating a risk profile by comparing the received system metric data to current privacy state requirements. The method can include, based on the risk profile, performing an action such as (i) updating a user interface to display a notification relating to the risk profile or (ii) generating and initiating a configuration file to adjust compute resource settings.

15 Claims, 7 Drawing Sheets

600

75

PRIVACY CHOREOGRAPHER FOR FULLY MANAGED SERVERLESS APPLICATION PLATFORMS

FIELD

The present disclosure relates generally to choreographing privacy settings in fully managed serverless application platforms. More particularly, the present disclosure relates to a privacy choreographer that utilizes privacy agents deployed within the system to generate risk profiles associated with system metric data. The risk profiles can be used to perform actions such as providing notifications highlighting the risk profile or generating and initiating a configuration file to adjust one or more compute resource settings of the fully managed serverless application platform.

BACKGROUND

Fully managed serverless application platforms include cloud computing services which allow application developers to build and deploy applications without managing physical computing resources and infrastructure. The platforms allow developers to focus resources on writing code and develop the system's logic without the need to manage physical computing resources such as servers. Fully managed serverless application platforms allow for automatic scaling of resources based on demand to provide for efficient resources utilization. The platform can allow for built-in services for database storage, authentication, or other functionalities. In some computing environments, the physical structures that are owned and managed by the cloud computing services can be located in multiple geographies. The multiple geographies can have associated compliance and regulatory requirements relating to data storage, retention, and processing.

SUMMARY

Aspects and/or advantages of embodiments of the present disclosure will be set forth in part in the following description, and/or can be learned from the description, and/or can be learned through practice of the embodiments.

In some aspects, the present disclosure provides for an example fully managed serverless computing system for choreographing privacy settings including one or more processors and one or more memory devices storing instructions that are executable to cause the one or more processors to perform operations. In some implementations the one or more memory devices can include one or more transitory or non-transitory computer-readable media storing instructions that are executable to cause the one or more processors to perform operations. In the example system, the operations can include receiving, from one or more privacy agents deployed by the agent deployment engine, system metric data including signals associated with one or more compute resources based on at least one of settings and functions of a respective compute resource of the one or more compute resources. The operations can include generating a risk profile by comparing the received system metric data to current privacy state requirements. The operations can include based on the risk profile, performing an action including at least one of (i) generating instructions that when executed by one or more processors cause a user interface to update to display a notification indicative of the risk profile and (ii) generating and initiating a configuration file to adjust one or more compute resource settings.

In some aspects, the present disclosure provides for an example computer-implemented method for choreographing privacy settings in fully managed serverless application platforms. The example method includes receiving, by an agent deployment engine of a computing system, from one or more privacy agents deployed by the agent deployment engine, system metric data including signals associated with one or more compute resources based on at least one of settings and functions of a respective compute resource of the one or more compute resources. The example method includes generating, by the computing system, a risk profile by comparing the received system metric data to current privacy state requirements. The example method includes based on the risk profile, performing, by the computing system, an action including at least one of (i) generating instructions that when executed by one or more processors cause a user interface to update to display a notification indicative of the risk profile and (ii) generating and initiating a configuration file to adjust one or more compute resource settings.

In some aspects, the present disclosure provides for an example transitory or non-transitory computer readable medium embodied in a computer-readable storage device and storing instructions that, when executed by a processor, cause the processor to perform operations. In the example transitory or non-transitory computer readable medium, the operations include obtaining, by a computing system, privacy input data. The operations include generating, by the computing system, a configuration file based on the privacy input data. The operations include deploying, by the computing system, one or more privacy agents by reading and executing the configuration file. The operations include monitoring, by the computing system, one or more compute resources associated with the system by: obtaining, by the computing system, system metric data; and aggregating, by the computing system, the system metric data. The operations include generating, by the computing system, based on the aggregated system metric data, a risk profile. The operations include performing, by the computing system, one or more actions based on the risk profile, the one or more actions including at least one of (i) generating instructions that when executed by one or more processors cause a user interface to update to display a notification indicative of the risk profile or (ii) generating and initiating a configuration file to adjust one or more compute resource settings.

BRIEF DESCRIPTION OF THE DRAWINGS

Detailed discussion of embodiments directed to one of ordinary skill in the art is set forth in the specification, which makes reference to the appended figures, in which.

DETAILED DESCRIPTION

In fully managed serverless platforms, there are large volumes of data processed across various geographies. Currently, there is not infrastructure in place to automatically manage privacy controls across applications hosted in serverless environments, generate reports, and/or alter privacy settings to comply with requirements. Current approaches do not allow for automatic generation of reports and/or determination of compliance with various privacy requirements. Thus, it is not possible to obtain a risk profile for the overall system in near real-time. Processing the volume of data in these systems cannot practically be formed by a human, as such, a new infrastructure is required to provide for system wide visibility in an automatic fashion. The present disclosure describes this new infrastructure that solves these problems.

Aspects of the present disclosure address the above deficiencies by providing a privacy choreographer to embed privacy controls in fully managed serverless application platforms to ensure that consistent privacy levels are applied to all deployed applications in the fully managed serverless application platform. For instance, an agent deployment engine can deploy privacy agents across nodes of the system to log into inputs and/or data sources to record information. A signal aggregator of the privacy choreographer can obtain the recorded data and/or work with an abstraction database to abstract and/or consolidate data associated with privacy compliance. The data associated with privacy compliance can include data location, data types, examples of data, encryption in transit type, encryption at rest type, deletion and/or retention rules, access rules, loss prevention rules, and/or other information which can be used to manage user input and/or compliance to generate privacy notices, utilize an agent deployment engine, and/or signal aggregator. Based on the aggregated data, the system can generate privacy notices to display current privacy policies in place as well as surface any discrepancies between set policies and/or the actual state of the system. In some instances, based on any surfaced discrepancies, a notification can be provided and/or a change to the system state can occur. The change to the system state can occur by generating a configuration file and/or executing the configuration file to deploy updates to the infrastructure of the system. This improved system architecture provides for the ability to aggregate data in such a way that it can be parsed and/or utilized in automatically generating reports that communicate the state of the system which were otherwise unattainable at such a scale.

With reference now to the figures, example embodiments of the present disclosure will be discussed in further detail.

Figure 1:
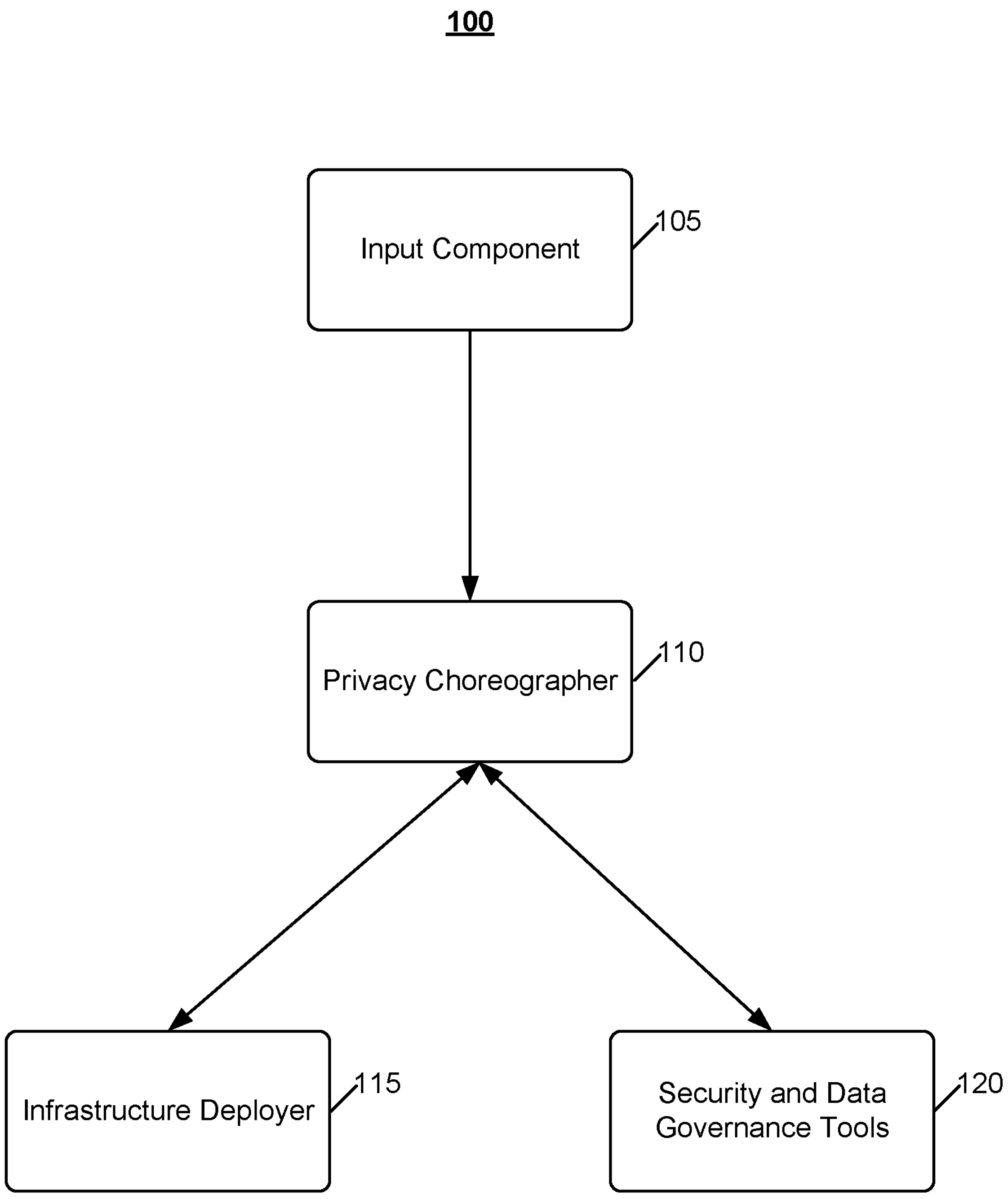
FIG. 1 depicts a block diagram of an example system for monitoring privacy state and/or deploying infrastructure according to example embodiments of the present disclosure.

FIG. 1 depicts a block diagram of an example system 100 for choreographing privacy settings for a fully managed serverless platform. The example system can include an input component 105, a privacy choreographer 110, infrastructure deployer 115, and/or security and data governance tools 120. Each of these components will be described further with regards to FIG. 2 through FIG. 5.

Input component 105 can obtain input data. The input data can include privacy input data and/or infrastructure input data. Privacy input data can include input data associated with a number of privacy requirements and/or preferences. In some implementations, privacy input data can be obtained via user input. Additionally, and/or alternatively, privacy input data can be obtained via crawling existing resources to obtain relevant information (e.g., scraping standards from web pages, ingesting standards stored in a database). The input component 105 can correspond to input component 202 in FIG. 2. The privacy input data will be described in further detail in FIG. 2 and/or FIG. 3.

Example system 100 can include a privacy choreographer 110. The privacy choreographer can coordinate generating privacy notices, generating configuration files, and/or deploying privacy agents. These operations will be discussed further in regard to FIG. 2. For instance, privacy choreographer 110 can correspond to privacy choreographer 215 in FIG. 2. Generating privacy notice can include generating data that can cause a message relating to certain privacy settings associated with a system. Generating a configuration file can include generating a configuration file specifying a number of infrastructure settings which can be implemented by infrastructure deployer 115. Deploying privacy agents can include utilizing application programming interfaces to interface between an agent deployment engine and/or the system infrastructure to gather system metric data associated with various portions of the system infrastructure. Each node of the system infrastructure can be associated with an agent that can allow for quick obtaining, aggregating, and/or parsing of data from all the nodes of the system to be utilized to determine a current system state associated with privacy compliance and/or a risk profile of the system.

Example system 100 can include infrastructure deployer 115. For instance, infrastructure deployer 115 can include executing the configuration file to adjust the infrastructure of the system. Examples of infrastructure deployment will be discussed further relating to FIG. 2 and/or FIG. 4. For example, infrastructure deployer 115 can correspond to infrastructure deployer 250 in FIG. 2.

In some instances, the infrastructure deployer 115 can work with security and governance tools 120 and/or the privacy choreographer 110 to monitor the system. For instance, the example system 100 can obtain system metric data, aggregate and/or compile system metric data, and/or generate data objects. The system metric data can be compared to privacy input data and/or relevant privacy standards to determine a risk profile and/or compliance level associated with the system.

Obtaining system metric data can be performed using privacy agents. For instance, the privacy agents can include crawlers that can access systems to scrape and/or otherwise obtain data, such as system metric data. In some instances, each node of the system can have a privacy agent associated with the node as described in FIG. 2.

The system can aggregate and/or compile system metric data (e.g., by signal aggregator 240). For instance, an abstractor functioning in combination with an abstraction database (e.g., abstraction database 235) can pull data to an abstracted processor to allow for recording and/or secondary functions including aggregation and/or compilation as described in FIG. 2.

A compiler and/or aggregator of the system can generate data objects. For instance, the compiler and/or aggregator can receive data from privacy agents associated with sources (e.g., crawlers associated with nodes of the system) to create a number of data objects. The number of data objects can be used by other nodes of the system, such as configuration file generator, agent deployment engine, and/or privacy notice generator to generate data including instructions, that when executed, perform decision making operations and/or data recording. In some implementations, the instructions can cause generation of an output and/or transmission to a number of nodes. For instance, the instructions can be read to perform actions such as updating a user interface to highlight information which can be interacted with by a user, automatically generating a new configuration file, and/or adjusting settings associated with the deployed privacy agents. This will be discussed further in relation to signal aggregator 240 in FIG. 2.

In some instances, based on monitoring the system, a privacy notice can be generated, a new configuration file can be generated, and/or an alert can be provided via a graphical user interface to display a notification associated with the system being in and/or out of compliance with relevant privacy requirements and/or preferences. The obtaining of system metric data as well as the combination of system metric data into a usable format will be described in further detail relating to FIG. 2, FIG. 5, and/or FIG. 6.

Figure 2:
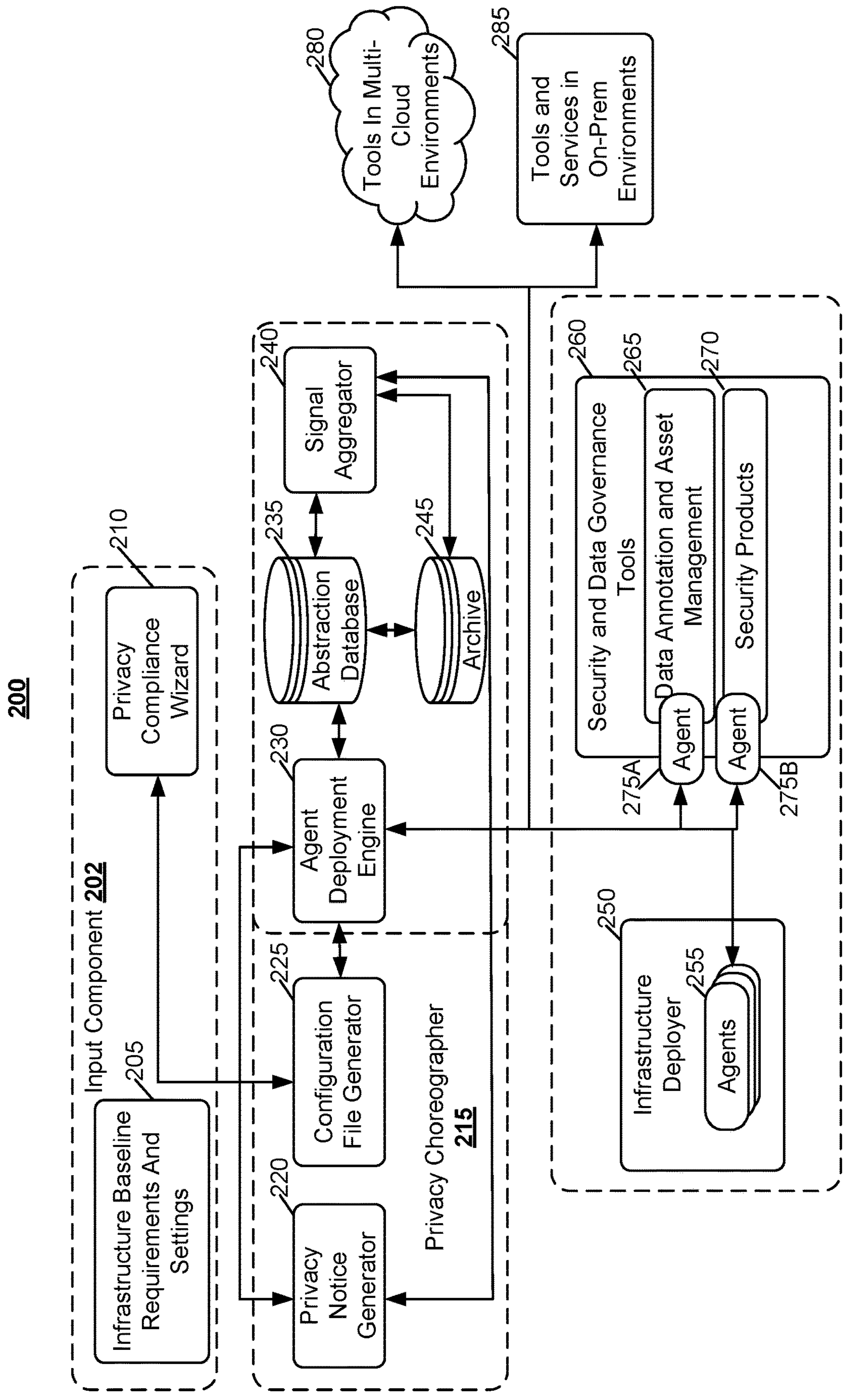
FIG. 2 depicts a more detailed block diagram of an example system for monitoring privacy state and/or deploying infrastructure according to example embodiments of the present disclosure.

FIG. 2 depicts an example system architecture 200 for a privacy choreographer for fully managed serverless application platforms. Example system architecture 200 can include infrastructure baseline requirements and/or settings 205 and/or a privacy compliance wizard 210. The privacy compliance wizard 210 can be used to automatically determine settings, preferences, and/or requirements for certain features. The privacy compliance wizard 310 will be discussed further in FIG. 3.

The system architecture 200 can include a privacy choreographer 215. The privacy choreographer 215 can include privacy notice generator 220, configuration file generator 225, agent deployment engine 230, abstraction database 235, signal aggregator 240, and/or archiver 245.

The system architecture 200 can be associated with a managed serverless system. The system can include a user interface utilized to configure infrastructure and/or baseline settings associated with the managed serverless system. For instance, the managed serverless system can include a number of web applications. The web applications can include, for example, a web server, an application server, and/or storage.

Privacy notice generator 220 can generate customized privacy notices. For instance, the privacy notices can provide for product level privacy notices, greater precision in terms of the privacy notice, and/or transparency in privacy practices being implemented by the system based on the inputted preferences as well as determined system state. Privacy notice generator 220 can communicate with signal aggregator 240 to obtain aggregated data representing the current privacy state of the system and generate a privacy risk profile. The generated privacy risk profile can be utilized by the privacy notice generator to produce flags or alerts associated with the system state and provide organizational insight for the privacy state of the system.

The privacy notice generator 220 can generate a notice for a system's privacy policy. In some instances, a new regulation can be made accessible or the system can determine a spin up of a new node. The privacy notice generator 220 can perform functions against new regulation or new spin up of the new node to determine the privacy risk associated with the current system state.

Configuration file generator 225 can generate a configuration file that when executed causes spin up of cloud computing system resources with policies configured to align with privacy requirements. For instance, the privacy requirements can include geographic specific resourcing, data transfer rules, encryption, break glass, data annotations, and/or the like. The configuration file can include instructions to adjust infrastructure in order to keep the system in compliance with privacy requirements associated with the geographic bounds, user input, and/or other privacy compliance settings. In some instances, the configuration file generator 225 can generate new configuration files responsive to determining a risk profile associated with a system.

Additionally, and/or alternatively, the configuration file can include instructions that when executed by processors of the system deploy privacy agents. The privacy agents can collect system metric data (e.g., signal data) based on a number of settings and/or functions of each deployed resource. For instance, the signal data can include collection, data annotation, user sharing, notice and/or consent requirements, encryption, break glass permissions, logging the like. The privacy agents can transmit the data to the agent deployment engine 230. For instance, the data can include application logs, access logs, and/or other forms of data.

Agent deployment engine 230 can deploy agents for each node of the system. Agents can include entities that interact with other entities to gather data or cause a change. For instance, the agents perform functions such as signal collection or crawling through the system to gather data, identify flags, or identify alerts. The agents can be installed at each node of the system to collect data. By way of example, the agents can perform read functions of logging systems of the nodes to collect, monitor, and/or report data to the agent deployment engine 230.

The agent deployment engine 230 can communicate with the abstraction database 235, signal aggregator 240, privacy notice generator 220, and/or configuration file generator 225. For instance, the configuration file generator 225 can generate a number of agents with associated policies. The policies can abstract headers and/or row samples. For instance, the agents can collect, monitor, and/or report. The configuration file generator can receive data and/or functions as a loader for abstractions database. Each source (e.g., node) can utilize a separate agent to prevent leakage (e.g., each node gets its own agent (e.g., crawler). The memory limit for the agents can be set to avoid violation of privacy requirements. For instance, to comply with Health Information Privacy Requirements, a 5-day memory limit would be necessary. Limits can vary based on the privacy inputs obtained via the privacy compliance wizard 210. For instance, a user can provide input indicating a retention policy associated with specific data and/or specific categories of data. In some instances, the privacy agents can generate data annotations to accompany the obtained data.

The agent deployment engine 230 can obtain the signal data from the number of privacy agents. For instance, the number of privacy agents can include agents 255, agent 275A, or agent 275B. The agent deployment engine 230 can collect, index, and/or process the data aligning with privacy data models. The data that is obtained can be compiled and/or abstracted across a variety of privacy related attributes. This data can include the system metric data described herein.

In some instances, the agent deployment engine 230 can deploy agents across multiple cloud environments and/or can deploy agents in an on-premises environment. Additional infrastructure can be generated and/or maintained to allow for transmission of instructions to the other cloud environments and/or on-premises environments as well as pulling data from the other cloud environments and/or on-premises environments. Obtaining data from the various sources can require additional processing to ensure that data is not unintentionally shared in performing an audit of the system, determining appropriate actions to take, and/or initiating the actions.

Figure 4:
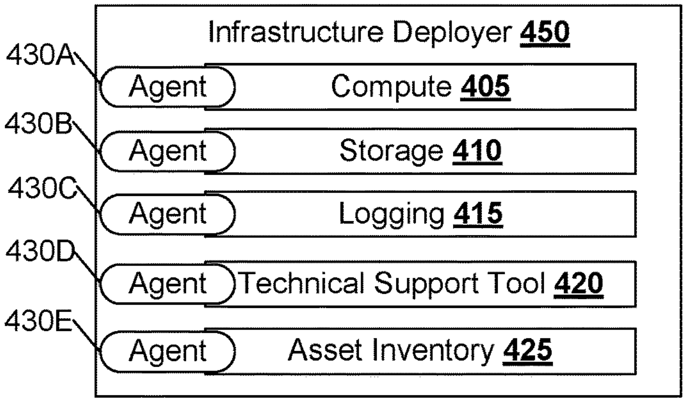
FIG. 4 depicts a block diagram of example infrastructure deployment for deploying infrastructure according to example embodiments of the present disclosure.
Figure 5:
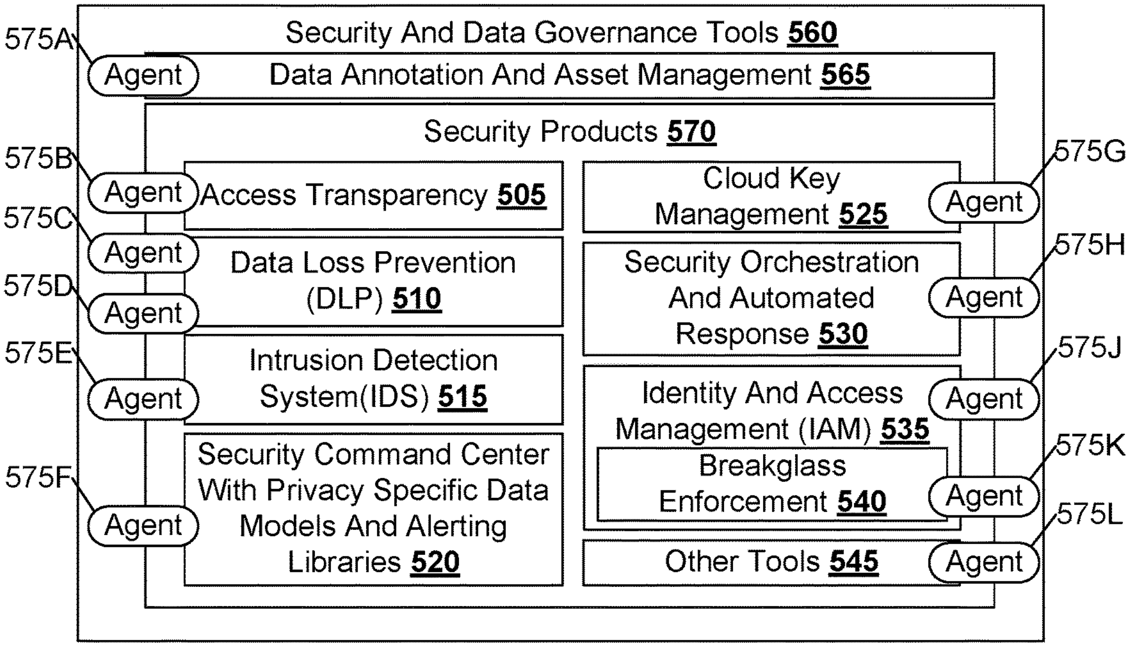
FIG. 5 depicts a block diagram of example security and governance tools or monitoring privacy state and/or deploying infrastructure according to example embodiments of the present disclosure.

Agent deployment engine 230 can obtain data from the deployed privacy agents at a regular cadence (e.g., every 15 minutes, every second, once a day, or any other cadence). For instance, agent deployment engine 230 can pull data from the agents and/or the agent can push data to the agent deployment engine 230. By pulling data from agents which are assigned to individual nodes of the system (e.g., as depicted in FIG. 4 and FIG. 5), a risk profile for the system can be generated in near-real time. The distribution of specialized agents can provide for agents that are tailored to obtain certain types of data which allow for faster processing by the agent deployment engine 230, abstraction database 235, signal aggregator 240, and privacy notice generator 220. Existing system fails to provide for the near real-time visibility into the privacy state of the system.

Additionally, or alternatively, agent deployment engine 230 can initiate a data pull based on a trigger. A trigger can include completion of a process, receipt of user input, obtaining an indication of new requirements or infrastructure. For instance, the system can determine from data obtained from privacy compliance wizard 210 that a new privacy policy has been released or uploaded or the system can obtain data indicative of spinning up of data storage in a new geography.

Abstraction database 235 can receive data from the agent deployment engine 230 and/or from privacy agents directly. For instance, the abstraction database 235 can store raw and/or processed data. As described herein, the abstraction database 235 can obtain the data from the agent deployment engine 230 (e.g., serving as an agent loader). The abstraction database can ingest the data received from the agent deployment engine 230. The abstraction database 235 can organize the data such that it can be accessed and/or utilized by the signal aggregator 240. For instance, the data can be used in correlation searches, alerting, and/or resource calibration.

The data stored within the abstraction database 235 can include a logging database. In some implementations, abstraction database 235 can transmit data to archive 245 to store data based on retention requirements.

In some implementations, the abstraction database 235 can be accessed to perform compliance management and/or generate automated data protection impact assessments and/or data transfer impact assessments. For instance, the abstraction database 235 can be accessed by signal aggregator 240.

Signal aggregator 240 can communicate with privacy notice generator 220 to determine if the current system state is in compliance with the generated privacy notice and/or privacy requirements obtained from privacy compliance wizard 210. Privacy notice generator can cause a user interface component to display the data from signal aggregator 240.

The signal aggregator 240 can provide for privacy by not forwarding raw data. Additionally, the system can run comparison scripts to determine system diagnostics such as a risk profile associated with the current privacy state of the system compared to the target settings of the system (e.g., as determined by user input obtained including infrastructure baseline requirements and/or settings 205 and/or privacy compliance wizard 210.

For instance, the signal aggregator 240 can process the data from abstraction database 235 to communicate with privacy notice generator 220 to generate summaries and/or other visual displays of the data. For example, the privacy notice generator 220 can generate reports and/or aggregated insights.

Reports generated by privacy notice generator 220 can include flagged or updated organizational insights. The insights can be based on a risk profile that is generated based on the aggregated data and a comparison of the current privacy state of the system, the existing privacy notice, and the privacy preferences and requirements obtained from the privacy compliance wizard 210. The reports can include highlighting and/or otherwise distinguishing abnormalities and/or points of concern. This could include a region being out of compliance due to a recent update in the law and/or a region being out of compliance due to a need for adjusting settings. In some instances, the system can recommend adjustments to settings and/or adjustments to the configuration files to be made to address any issues that are raised. In some instances, the system can automatically adjust system settings (e.g., via generation and/or execution of a configuration file) and/or provide a notification via the user interface that a change has been made.

Additionally, and/or alternatively, the privacy notice generator 220 can generate printouts of the current state of the system which can be provided for display via a user interface. In some implementations, reports can be automatically generated for review which can be generated in a format to be shared with third party organizations. The third-party organizations can include auditors and/or regulatory organizations. The printouts of the current state of the system can be used to evidence technical and/or organization controls being used by the system that are associated with regulations. The printouts can provide confirmation that the system is in compliance with regulations and/or ensure that data remains private. Thus, the system can not only generate a report indicating what compliance requirements are being met, but it can additionally provide evidence to support the conclusions.

As depicted in system architecture 200, agent deployment engine 230 can deploy a number of agents such as agents 255 and/or agents 275A-275B. For instance, agents 255 can be associated with infrastructure deployer 250. For instance, agents 275A-275B can be associated with security and/or data governance 260. Infrastructure deployment 450 will be described further in FIG. 4 and security and/or data governance 260 will be described further in FIG. 5.

The agent deployment engine 230 can deploy agents at nodes associated with infrastructure deployer 250, security and/or data governance 260, tools in multi-cloud environments 280, and/or tools and/or services in on-prem environments 285.

Figure 3:
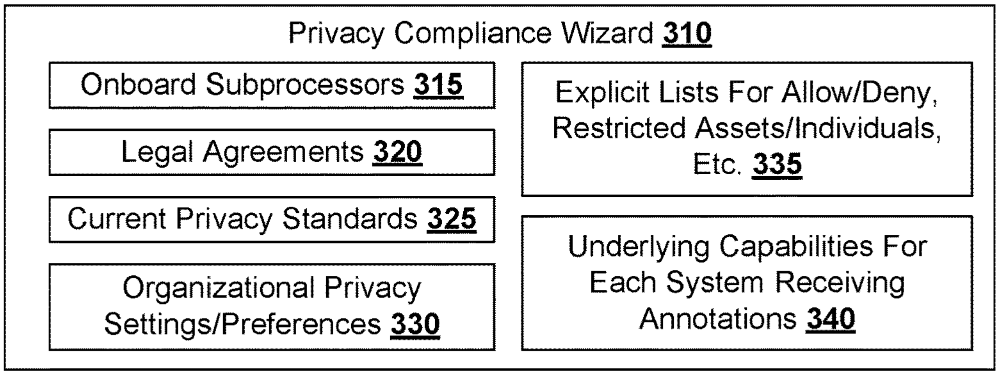
FIG. 3 depicts a block diagram of an example privacy compliance wizard for monitoring privacy state according to example embodiments of the present disclosure.

Turning to FIG. 3, the privacy compliance wizard 310 (e.g., privacy compliance wizard 210) can obtain user input data and/or compliance regulatory input data. The input data can include, for example, onboarded sub processors 315, legal agreements 320, current privacy standards 325, organizational privacy settings/preferences 330, explicit lists for allow/deny and/or restricted assets/individuals 335, and/or underlying capabilities for each system receiving annotations 340.

Onboarded sub processors 315 can include processors that are associated with the computing system. For instance, the sub processors can be cleared for processing certain data. The sub processors can include external entities and/or services that are formally approved to be integrated into the system (e.g., by a customer, by the fully managed serverless platform provider). The sub processors can perform specialized tasks and/or provide functionalities as part of the serverless computing environment. This can allow for an extension of available computing resources to perform capabilities.

Legal agreements 320 can include contracts and/or terms established between a fully managed serverless platform provider and/or a customer (e.g., between a cloud service provider and/or the cloud service user/customer). The agreements can include terms relating to the responsibilities, liabilities, and/or compliance requirements associated with data processing, privacy, and/or use.

Current privacy standards 325 can include regulations and/or guidelines associated with the collection, processing, and/or storage of user data. For instance, the current privacy standards can be influenced by regional laws (e.g., General Data Protection Regulation (GDPR), California Consumer Privacy Act (CCPA)).

Organizational privacy settings/preferences 330 can include user-configurable settings that dictate how data is processed, stored, and/or otherwise handled. For instance, the settings can include preferences related to data sharing, storage duration, and/or other privacy-related settings.

Explicit lists for allow/deny and/or restricted assets/individuals 335 can include listings of entities and/or actions that are permitted and/or prohibited. For instance, an entity on the allow list can be permitted to access and/or process certain data whereas an entity on the deny list can be prohibited from doing so. Restricted assets can include elements and/or compute resources with limited access to allow for confidentiality and/or integrity of the system. The assets can include, for example, sensitive data, configuration, and/or critical components. Restricting the access of these assets can help to mitigate security risks and/or unauthorized activities.

Underlying capabilities for each system receiving annotations 340 can include functionality, scalability, and/or performance. For instance, this can include the system's ability to efficiently process and/or execute functions, dynamically scale based on demand, and/or provide a reliable and/or responsive computing environment for developers. These capabilities allow for abstracting infrastructure complexities to allow for users to build bespoke applications without the need to manage their own hardware.

Turning to FIG. 4, infrastructure deployment 450 (e.g., infrastructure deployer 250) can include adjusting various nodes of the system. The nodes of the system can include compute 405, storage 410, logging 415, technical support tool 420, asset inventory 425, and/or other infrastructure of the computing system.

Compute 405 can include processing power and/or resources required to execute functions and/or run applications. The serverless computing system (e.g., cloud provider) can automatically allocate and/or scale compute resources dynamically based on actual workload. This allows for developers to focus on writing code without managing the underlying servers and/or allocation of computing resources.

Storage 410 can include management and/or persistence of data. Developers can utilize storage of the serverless computing system to store and/or retrieve data without actively provisioning and/or managing storage infrastructure. Thus, diverse data types can be handled, and/or seamless integration can be performed with serverless applications.

Logging 415 can include capturing and/or recording events, errors, and/or other relevant information during the execution of functions and/or applications within the serverless computing environment. The logged data can be used (e.g., obtained via privacy agents, stored in an abstraction database) to allow for monitoring and/or analyzing the system state. For instance, the logged data can be processed to determine system performance and/or utilization, troubleshoot problems, and/or determine behavior of the serverless applications.

Technical support tool 420 can include a resource and/or service provided by the serverless computing system to aid developers in resolving issues, obtaining guidance, and/or accessing documentation. For instance, technical support tools can be accessed via the user interface of a computing device associated with the developer to access online documentation, forums, chats, and/or the like to address challenges faced by the developers when developing and/or deploying applications via the serverless computing system.

Asset inventory 425 can include a list and/or catalog of resources and/or components within a serverless application. The list and/or catalog can include functions, databases, storage, and/or other elements. The asset inventor allows for developers to manage and/or track components, dependencies, and/or configurations. Managing and/or tracking these components allows for improved organization and/or maintenance of the system.

Each of the nodes can have an agent assigned to coordinate data transfer between the node and/or the agent deployment engine. For instance, compute 405 can be associated with agent 430A, storage 410 can be associated with agent 430B, logging 415 can be associated with agent 430C, technical support tool 420 can be associated with agent 430D, and asset inventory 425 can be associated with agent 430E. For each node of the system, an agent can be used to monitor privacy compliance, generate a risk profile, and/or perform a number of actions. For instance, the agents can be application programming interfaces (APIs), crawlers, and/or other tools used to push and/or pull data to and/or from the various infrastructure components.

Turning to FIG. 5, security and/or data governance tools 560 (e.g., security and/or data governance 260) can include data annotations and/or asset management 565 (e.g., data annotations and/or asset management 265), security products 570 (e.g., security products 270), and/or agents 575A-L. Security products 570 can include, for example, access transparency 505, data loss prevention (DLP) 510, intrusion detection system (IDS) 515, security command center with privacy specific data models and/or alerting libraries 520, cloud key management 525, security orchestration and/or automated response 530, identity and/or access management (IAM) 535, and/or any other tools 545.

Access transparency 505 can include providing visibility and/or accountability relating to the access of data. For instance, this can include capturing system state data associated with data access. Such as the data that was accessed, the identifier that was associated with the access, time of the access, purpose for the access. Thus, the data can be parsed to track and/or investigate unauthorized and/or malicious activities.

Data loss prevention (DLP) 510 can include policies and/or controls to prevent and/or reduce unauthorized disclosure and/or leakage of sensitive information and/or data. Serverless platforms can integrate data loss prevention measures to monitor, detect, and/or block potential data breaches. This allows for securely handling sensitive data throughout the lifecycle of the data in the serverless computing environment.

Intrusion detection system (IDS) 515 can include identification and/or response to suspicious and/or malicious activities. This can include monitoring events within the serverless computing environment by processing historical data to determine patterns, raising alerts, and/or initiating preventative actions in real and/or near real-time to mitigate threats. The IDS can maintain integrity and/or security of applications within the serverless computing environment.

Security command center with privacy specific data models and/or alerting libraries 520 can include a centralized platform and/or tool which can provide a view of the security posture of the serverless infrastructure. The security command center can work with the agent deployment engine, abstraction database, signal aggregator, to aggregate security-related data. The security-related data can include, for example, access logs, vulnerability assessments, threat intelligence, and/or other relevant data which can be surfaced to a user via a user interface. For instance, this data can be surfaced via a dashboard. The dashboard can utilize the methods described herein to surface points of concern, recommend actions to remedy the points of concern, and/or perform other actions.

Cloud key management 525 can include secure generation, storage, and/or lifecycle management of cryptographic keys used in the system. The cryptographic keys can be used to encrypt data throughout the serverless computing system. The system can utilize different encryption protocols for data stored at rest and/or data in transit. The cloud key management 525 can include secure key storage, rotation, and/or access control.

Security orchestration and/or automated response 530 can include using the methods described herein to coordinate tools within the serverless computing environment to streamline incident detection, investigation, and/or mitigation. This can allow for more efficient responses to security incidents to reduce manual intervention and/or enhance the resilience of the serverless computing environment.

Identity and/or access management (IAM) 535 can include break glass enforcement 540. IAM can control and/or manage user access to resources within the serverless computing environment. For instance, an entity can set up rules and/or initiate default rules to define and/or enforce policies relating to user permissions, authentication, and/or authorization. IAM can include break glass enforcement 540 to designate users and/or parties that can utilize a break glass tool in order to remedy issues in emergencies.

Break glass enforcement 540 can include, for example, providing authorized access to critical systems and/or sensitive information in situations where normal mechanisms and/or processes are unavailable and/or impractical. The break glass procedures bypass standard security measures to allow for prompt addressing of problems. Break glass enforcement 540 can be used in various circumstances. These circumstances can include, for example, emergency access, key personnel unavailability, security incidents, system failures, and/or disaster recovery.

Each of the nodes can have an agent assigned to coordinate data transfer between the node and/or the agent deployment engine. For instance, data annotations and asset management 565 can be associated with agent 575A, security products 570 can be associated with agent 575B, access transparency 505 can be associated with agent 575C, data loss prevention (DLP) 510 can be associated with agent 575D, intrusion detection system (IDS) 515 can be associated with agent 575E, security command center with privacy specific data model and alerting libraries 520 can be associated with agent 575F, cloud key management 525 can be associated with agent 575G, security orchestration and automated response 530 can be associated with a gent 575H, identity and/or access management (IAM) 535 can be associated with agent 575J, break glass enforcement 540 can be associated with agent 575K, and other tools 545 can be associated with one or more agent 575L. For each node of the system, a respective agent can be used to monitor privacy compliance, generate a risk profile, and/or perform a number of actions. For instance, the agents can be application programming interfaces (APIs), crawlers, and/or other tools used to push and/or pull data to and/or from the various infrastructure components.

Figure 6:
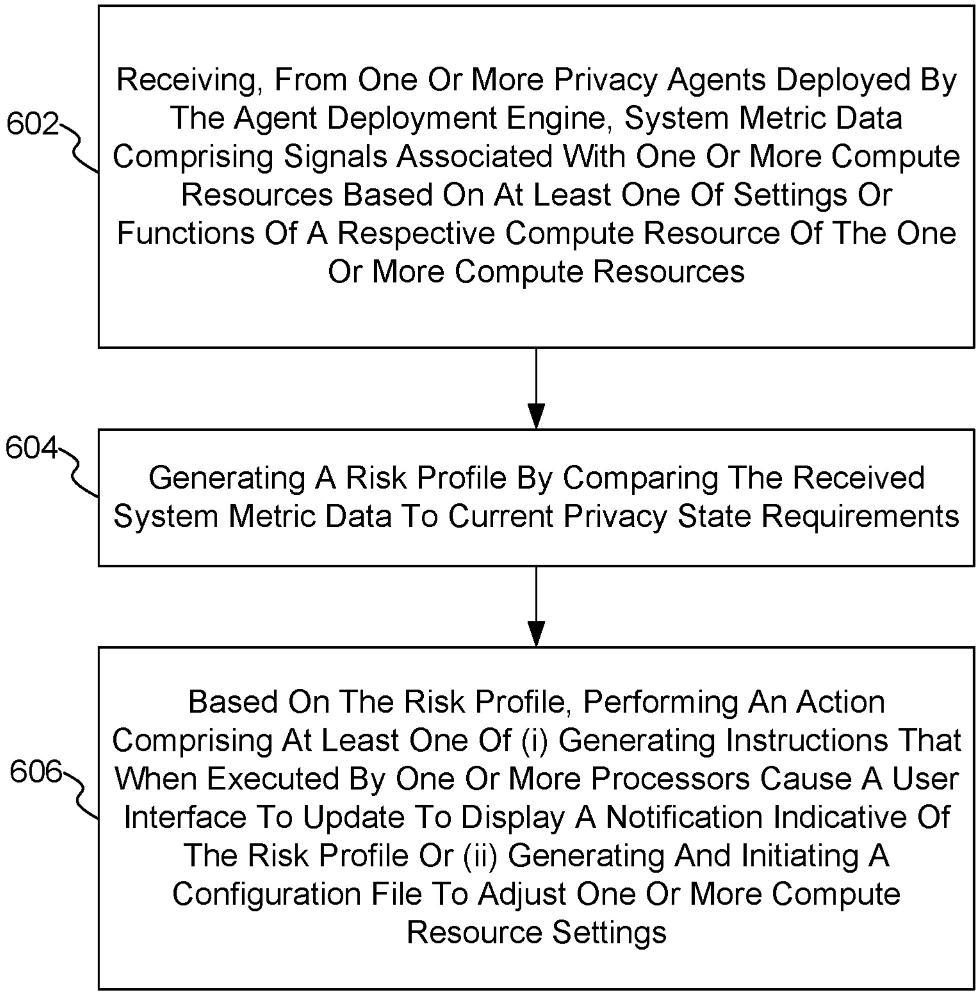
FIG. 6 depicts a flow chart of an example method for monitoring privacy state and/or deploying infrastructure according to example embodiments of the present disclosure.

FIG. 6 is a flow diagram of an example method 600 to coordinate privacy in a fully managed serverless platform in accordance with some embodiments of the present disclosure. The method 600 can be performed by processing logic that can include hardware (e.g., processing device, circuitry, dedicated logic, programmable logic, microcode, hardware of a device, integrated circuit, etc.), software (e.g., instructions run and/or executed on a processing device), and/or a combination thereof. In some embodiments, example method 600 is performed by privacy choreographer 215, client computing system 702, and/or cloud provider computing system 704. Although shown in a particular sequence and/or order, unless otherwise specified, the order of the processes can be modified. Thus, the illustrated embodiments should be understood only as examples, and/or the illustrated processes can be performed in a different order, and/or some processes can be performed in parallel. Additionally, one or more processors can be omitted in various embodiments. Thus, not all processes are required in every embodiment. Other process flows are possible.

At operation 602, processing logic can receive, from a number of privacy agents deployed by the agent deployment engine, system metric data including signals associated with compute resources based on at least one of settings and/or functions of a respective compute resource of the number of compute resources.

The privacy agents can be application programming interfaces installed in at least one of (i) a cloud computing environment, (ii) a multi cloud computing environment, and/or (iii) an on-prem environment. For example, a customer of a cloud provider could be a customer of multiple cloud providers. The present disclosure can utilize privacy agents distributed across a number of providers and allow the customer a single user interface to access data associated with their privacy compliance (e.g., via a dashboard on a user interface of the client device). Additionally, the present disclosure can utilize privacy agents distributed in an on-prem environment and allow the customer the single user interface to access data associated with their privacy compliance.

The system metric data can include at least one of (i) compute metrics, (ii) application metrics, (iii) resource utilization metrics, and/or (iv) logging metrics.

Compute metrics are used to determine processing power and/or resources utilized relating to execution of functions. Compute metrics can include data relating to duration, frequency, and/or resource consumption of individual function invocations. Compute metrics can be used to determine performance optimizations, identifying bottlenecks, and/or managing costs by determining overall compute resources being utilized.

Application metrics are used to determine overall performance and/or behavior of applications. Application metrics can include response times, error rates, throughput, and/or other metrics. Application metrics can be used to detect issues, ensure reliability, and/or optimizing end-user experience.

Resource utilization metrics can include usage of various compute resources such as central processing unit (CPU), memory, and/or storage. The metrics can assess utilization of resources during execution of functions to allow for optimization of configurations to allocate resources.

Logging metrics can include metrics relating to analyzing data logs generated by functions and/or execution to extract insights relating to application behavior, errors, and/or execution details. In some instances, the metrics can include log event frequencies, patterns, and/or critical error alerts. The logging metrics can be used to debug, troubleshoot, and/or maintain security and/or reliability of serverless applications. In some implementations, the logging metrics are stored in the abstraction database.

In some implementations, the processing logic can obtain privacy input data. The processing logic can generate a configuration file based on the privacy input data. The processing logic can deploy a number of privacy agents by reading and executing the configuration file.

At operation 604, processing logic can generate a risk profile by comparing the received system metric data to current privacy state requirements. The current privacy state requirements can be based on data including at least one of: onboard sub processors, legal agreements, privacy standards, organizational privacy settings and/or preferences, explicit lists, and/or underlying capabilities of a number of systems receiving annotations. As described herein, the privacy state requirements can be determined based on input data provided by a user or can be obtained by the system crawling resources associated with privacy compliance (e.g., standard setting webpages, documents uploaded by a user, etc.).

The risk profile can be generated from gathering data from thousands of resources associated with the fully managed serverless system (e.g., thousands of nodes, virtual machines, etc.). The data can be concatenated with annotations such that it can be parsed to surface useful information. For instance, the system can crawl across all systems it has been granted access to and log various endpoints and data sources. The system can record and abstract the information which can include data location, data types, examples of data, encryption transition time, encryption at rest type, deletion and retention rules, access rules, loss prevention rules, or other relevant data.

The gathered data can be processed by the system, for instance can be compared to the current privacy state requirements to determine if the nodes in the system are in compliance with the current privacy state requirements. The risk profile can indicate a risk level associated with the system based on the level of compliance with the privacy state requirements.

As an example, a process can be set up where the data is stored in a distributed manner such that data associated with a workflow is stored in three different geographies. The data stored in a first geography can be associated with a 5-day retention period. At the 3-day mark, the data can be required to be transmitted to a different geography. The present disclosure can provide for ensuring that the data that is transferred keeps the 5-day retention period and is destroyed two days from the data of transfer (e.g., rather than the 5-day retention period being restarted when the data is transferred. This can be accomplished by processing the annotated data to determine when the data was first generated or stored, privacy compliance requirements associated with the type of data, transfer history of the data, and any other relevant information. By distributing privacy agents to each node of the system, the system can ensure that the data being received by the system is streamlined and presented in a manner that it can be concatenated and useful for latter processing.

In some implementations, the processing logic can execute the configuration file to spin up a number of resources in compliance with the privacy state requirements. For instance, the configuration file includes instructions that when executed by a processor causes spin up of a number of compute resources that comply with the privacy state requirements. In some implementations, the processing logic can execute the configuration file to deploy infrastructure including at least one of compute, storage, technical support tool, asset inventory, and/or logging.

For instance, the processing logic can monitor compute resources associated with the system by obtaining system metric data and/or aggregating the system metric data. In some instances, the processing logic can generate, based on the aggregated system metric data, a risk profile.

Generating the risk profile can include generating mapped log data based on the received system metric data. Generating the mapped log data can include obtaining the received metric data from a number of privacy agents. The received system metric data can include a number of annotations. Generating the mapped log data can include indexing the received system metric data based on the number of annotations. Generating the mapped log data can include processing, using a number of privacy data models, the log data. Generating the mapped log data can include mapping data by correlating groups of data based on a number of privacy related attributes.

At operation 606, processing logic can perform, based on the risk profile, an action including at least one of (i) generating instructions that when executed by a number of processors cause a user interface to update to display a notification indicative of the risk profile and/or (ii) generate and/or initiate a configuration file to adjust a number of compute resource settings.

For instance, the client device can include a graphical user interface which can provide a dashboard for display. The dashboard can include a graphical depiction of the current state of the system. This can include alerts or messages associated with areas of concern, printouts of the current state of the system, selectable interface components to be used to generate pre-defined or bespoke reports.

By way of example, the system can automatically generate Data Protection Impact Assessments (DPIAs) and Data Transfer Impact Assessments (DTIAs) or automatically adjust system settings or provide an alert via a user interface when breach of compliance is detected. This can provide real-time or near real-time visibility into the scope of risk attached to a fully managed serverless platform's storage and asset inventory. This data can be used to show regulators or customers the current state of the system and whether it complies with privacy requirements.

FIG. 7 depicts a block diagram of an example computing system 700 that can choreograph privacy for fully managed serverless application platforms according to example embodiments of the present disclosure. The computing system 700 includes a client computing system 702 a cloud provider computing system 704 that are communicatively coupled over a network 780.

The client computing system 702 can be any type of computing device, such as, for example, a personal computing device (e.g., laptop and/or desktop), a mobile computing device (e.g., smartphone and/or tablet), a gaming console and/or controller, a wearable computing device, an embedded computing device, and/or any other type of computing device.

The client computing system 702 includes processors 712 and/or a memory 714. The processors 712 can be any suitable processing device (e.g., a processor core, a microprocessor, an ASIC, an FPGA, a controller, a microcontroller, etc.) and/or can be one processor and/or a plurality of processors that are operatively connected. The memory 714 can include non-transitory computer-readable storage media, such as RAM, ROM, EEPROM, EPROM, flash memory devices, magnetic disks, etc., and/or combinations thereof. The memory 714 can store data 716 and/or instructions 718 which are executed by the processor 712 to cause the client computing system 702 to perform operations.

In some implementations, the client computing system 702 can include user input component 720. User input component 720 can be used to obtain privacy input data 722 and/or infrastructure input data 724. Privacy input data 722 can include input data associated with privacy requirements and/or preferences. Infrastructure input data 724 can include baseline requirements for the system such as compute services, storage products and/or associated retention preferences, technical support services, asset inventory, and/or logging.

The client computing system 702 can also include user input component 720 that receives user input. For example, the user input component 720 can be a touch-sensitive component (e.g., a touch-sensitive display screen and/or a touch pad) that is sensitive to the touch of a user input object (e.g., a finger and/or a stylus). The touch-sensitive component can serve to implement a virtual keyboard. Other example user input components include a microphone, a traditional keyboard, and/or other means by which a user can provide user input.

In some implementations, the client computing system 702 can include privacy choreographer 730. Privacy choreographer 730 can include privacy notice generator 732, agent deployment engine 734, and/or signal aggregator 736.

In some implementations, the client computing system 702 can store and/or include machine-learned models. For example, the machine-learned models can include a personalized privacy model. The machine-learned models can be and/or can otherwise include various machine-learned models such as neural networks (e.g., deep neural networks) and/or other types of machine-learned models, including non-linear models and/or linear models. Neural networks can include feed-forward neural networks, recurrent neural networks (e.g., long short-term memory recurrent neural networks), convolutional neural networks and/or other forms of neural networks. Some example machine-learned models can leverage an attention mechanism such as self-attention. For example, some example machine-learned models can include multi-headed self-attention models (e.g., transformer models).

In some implementations, the machine-learned models can be received from the cloud provider computing system 704 over network 780, stored in the user computing device memory 714, and/or then used and/or otherwise implemented by the processors 712. In some implementations, the client computing system 702 can implement multiple parallel instances of a single machine-learned model (e.g., to perform parallel processing across multiple instances of personalized privacy models).

Additionally, and/or alternatively, machine-learned models can be included in and/or otherwise stored and/or implemented by the cloud provider computing system 704 that communicates with the client computing system 702 according to a client-server relationship. For example, the machine-learned models can be implemented by the cloud provider computing system as a portion of a web service (e.g., a content-selection service service). Thus, machine-learned models can be stored and/or implemented at the client computing system and/or models can be stored and/or implemented at the cloud provider computing system 704.

The cloud provider computing system 704 includes processors 742 and/or a memory 744. The processors 742 can be any suitable processing device (e.g., a processor core, a microprocessor, an ASIC, an FPGA, a controller, a microcontroller, etc.) and/or can be one processor and/or a plurality of processors that are operatively connected. The memory 744 can include non-transitory computer-readable storage media, such as RAM, ROM, EEPROM, EPROM, flash memory devices, magnetic disks, etc., and/or combinations thereof. The memory 744 can store data 746 and/or instructions 748 which are executed by the processor 742 to cause the cloud provider computing system 704 to perform operations.

In some implementations, the cloud provider computing system 704 includes and/or is otherwise implemented by server computing devices. In instances in which the cloud provider computing system 704 includes plural server computing devices, such server computing devices can operate according to sequential computing architectures, parallel computing architectures, and/or some combination thereof.

As described herein, the cloud provider computing system 704 can include privacy choreographer 750. Privacy choreographer 750 can include privacy notice generator 752, agent deployment engine 754, and/or signal aggregator 756.

Privacy choreographer 750 can be the same as, and/or be integrated with privacy choreographer 730. In some implementations, client computing system 702 can be one of a number of client computing systems with a number of privacy choreographers.

Cloud provider computing system 704 can include database 760. Database 760 can include system metric data 762 and/or annotation data 764. System metric data 762 can include compute metrics, application metrics, resource utilization metrics, or logging metrics. Annotation data 764 can include additional information associated with system metric data or other data. For instance, annotation data 764 can include data associated with a time in which the data was collected, user identifiers associated with accessing the data, tags associated with the data, or other information that could be relevant for the raw data.

As described above, the cloud provider computing system 704 can store and/or otherwise include machine-learned models. For example, the models can be and/or can otherwise include various machine-learned models. Example machine-learned models include neural networks and/or other multi-layer non-linear models. Example neural networks include feed forward neural networks, deep neural networks, recurrent neural networks, and/or convolutional neural networks. Some example machine-learned models can leverage an attention mechanism such as self-attention. For example, some example machine-learned models can include multi-headed self-attention models (e.g., transformer models).

The client computing system 702 and/or the cloud provider computing system 704 can train the models via interaction with a training computing system that is communicatively coupled over the network 780. The training computing system can be separate from the cloud provider computing system 704 and/or can be a portion of the cloud provider computing system 704.

The training computing system can include processors and/or a memory. The processors can be any suitable processing device (e.g., a processor core, a microprocessor, an ASIC, an FPGA, a controller, a microcontroller, etc.) and/or can be one processor and/or a plurality of processors that are operatively connected. The memory can include non-transitory computer-readable storage media, such as RAM, ROM, EEPROM, EPROM, flash memory devices, magnetic disks, etc., and/or combinations thereof. The memory can store data and/or instructions which are executed by the processor to cause the training computing system to perform operations. In some implementations, the training computing system includes and/or is otherwise implemented by server computing devices.

The training computing system can include a model trainer that trains the machine-learned models stored at the client computing system 702 and/or the cloud provider computing system 704 using various training and/or learning techniques, such as, for example, backwards propagation of errors. For example, a loss function can be backpropagated through the model(s) to update parameters of the model(s) (e.g., based on a gradient of the loss function). Various loss functions can be used such as mean squared error, likelihood loss, cross entropy loss, hinge loss, and/or various other loss functions. Gradient descent techniques can be used to iteratively update the parameters over a number of training iterations.

In some implementations, performing backwards propagation of errors can include performing truncated back-propagation through time. The model trainer can perform a number of generalization techniques (e.g., weight decays, dropouts, etc.) to improve the generalization capability of the models being trained.

In particular, the model trainer can train the machine-learned models based on a set of training data. The training data can include, for example, system metric data 762, annotation data 764, privacy input data 722, infrastructure input data 724, and/or other data.

In some implementations, if the user has provided consent, the training examples can be provided by the client computing system 702. Thus, in such implementations, the model provided to the client computing system can be trained by the training computing system on user-specific data received from the client computing system 702. In some instances, this process can be referred to as personalizing the model.

The model trainer includes computer logic utilized to provide desired functionality. The model trainer can be implemented in hardware, firmware, and/or software controlling a general purpose processor. For example, in some implementations, the model trainer includes program files stored on a storage device, loaded into a memory and/or executed by processors. In other implementations, the model trainer includes sets of computer-executable instructions that are stored in a tangible computer-readable storage medium such as RAM, hard disk, and/or optical and/or magnetic media.

The network 780 can be any type of communications network, such as a local area network (e.g., intranet), wide area network (e.g., Internet), and/or some combination thereof and/or can include any number of wired and/or wireless links. In general, communication over the network 780 can be carried via any type of wired and/or wireless connection, using a wide variety of communication protocols (e.g., TCP/IP, HTTP, SMTP, FTP), encodings and/or formats (e.g., HTML, XML), and/or protection schemes (e.g., VPN, secure HTTP, SSL).

The machine-learned models described in this specification can be used in a variety of tasks, applications, and/or use cases.

In some implementations, the input to the machine-learned model(s) of the present disclosure can be text and/or natural language data. The machine-learned model(s) can process the text and/or natural language data to generate an output. As an example, the machine-learned model(s) can process the natural language data to generate a language encoding output. As another example, the machine-learned model(s) can process the text and/or natural language data to generate a latent text embedding output. As another example, the machine-learned model(s) can process the text and/or natural language data to generate a translation output. As another example, the machine-learned model(s) can process the text and/or natural language data to generate a classification output. As another example, the machine-learned model(s) can process the text and/or natural language data to generate a textual segmentation output. As another example, the machine-learned model(s) can process the text and/or natural language data to generate a semantic intent output. As another example, the machine-learned model(s) can process the text and/or natural language data to generate an upscaled text and/or natural language output (e.g., text and/or natural language data that is higher quality than the input text and/or natural language, etc.). As another example, the machine-learned model(s) can process the text and/or natural language data to generate a prediction output.

In some implementations, the input to the machine-learned model(s) of the present disclosure can be speech data. The machine-learned model(s) can process the speech data to generate an output. As an example, the machine-learned model(s) can process the speech data to generate a speech recognition output. As another example, the machine-learned model(s) can process the speech data to generate a speech translation output. As another example, the machine-learned model(s) can process the speech data to generate a latent embedding output. As another example, the machine-learned model(s) can process the speech data to generate an encoded speech output (e.g., an encoded and/or compressed representation of the speech data, etc.). As another example, the machine-learned model(s) can process the speech data to generate an upscaled speech output (e.g., speech data that is higher quality than the input speech data, etc.). As another example, the machine-learned model(s) can process the speech data to generate a textual representation output (e.g., a textual representation of the input speech data, etc.). As another example, the machine-learned model(s) can process the speech data to generate a prediction output.

In some implementations, the input to the machine-learned model(s) of the present disclosure can be latent encoding data (e.g., a latent space representation of an input, etc.). The machine-learned model(s) can process the latent encoding data to generate an output. As an example, the machine-learned model(s) can process the latent encoding data to generate a recognition output. As another example, the machine-learned model(s) can process the latent encoding data to generate a reconstruction output. As another example, the machine-learned model(s) can process the latent encoding data to generate a search output. As another example, the machine-learned model(s) can process the latent encoding data to generate a reclustering output. As another example, the machine-learned model(s) can process the latent encoding data to generate a prediction output.

In some implementations, the input to the machine-learned model(s) of the present disclosure can be statistical data. Statistical data can be, represent, and/or otherwise include data computed and/or calculated from some other data source. The machine-learned model(s) can process the statistical data to generate an output. As an example, the machine-learned model(s) can process the statistical data to generate a recognition output. As another example, the machine-learned model(s) can process the statistical data to generate a prediction output. As another example, the machine-learned model(s) can process the statistical data to generate a classification output. As another example, the machine-learned model(s) can process the statistical data to generate a segmentation output. As another example, the machine-learned model(s) can process the statistical data to generate a visualization output. As another example, the machine-learned model(s) can process the statistical data to generate a diagnostic output.

In some implementations, the input to the machine-learned model(s) of the present disclosure can be sensor data. The machine-learned model(s) can process the sensor data to generate an output. As an example, the machine-learned model(s) can process the sensor data to generate a recognition output. As another example, the machine-learned model(s) can process the sensor data to generate a prediction output. As another example, the machine-learned model(s) can process the sensor data to generate a classification output. As another example, the machine-learned model(s) can process the sensor data to generate a segmentation output. As another example, the machine-learned model(s) can process the sensor data to generate a visualization output. As another example, the machine-learned model(s) can process the sensor data to generate a diagnostic output. As another example, the machine-learned model(s) can process the sensor data to generate a detection output.

In some cases, the input includes audio data representing a spoken utterance and/or the task is a speech recognition task. The output can include a text output which is mapped to the spoken utterance. In some cases, the task includes encrypting and/or decrypting input data. In some cases, the task includes a microprocessor performance task, such as branch prediction and/or memory address translation.

Figure 7A:
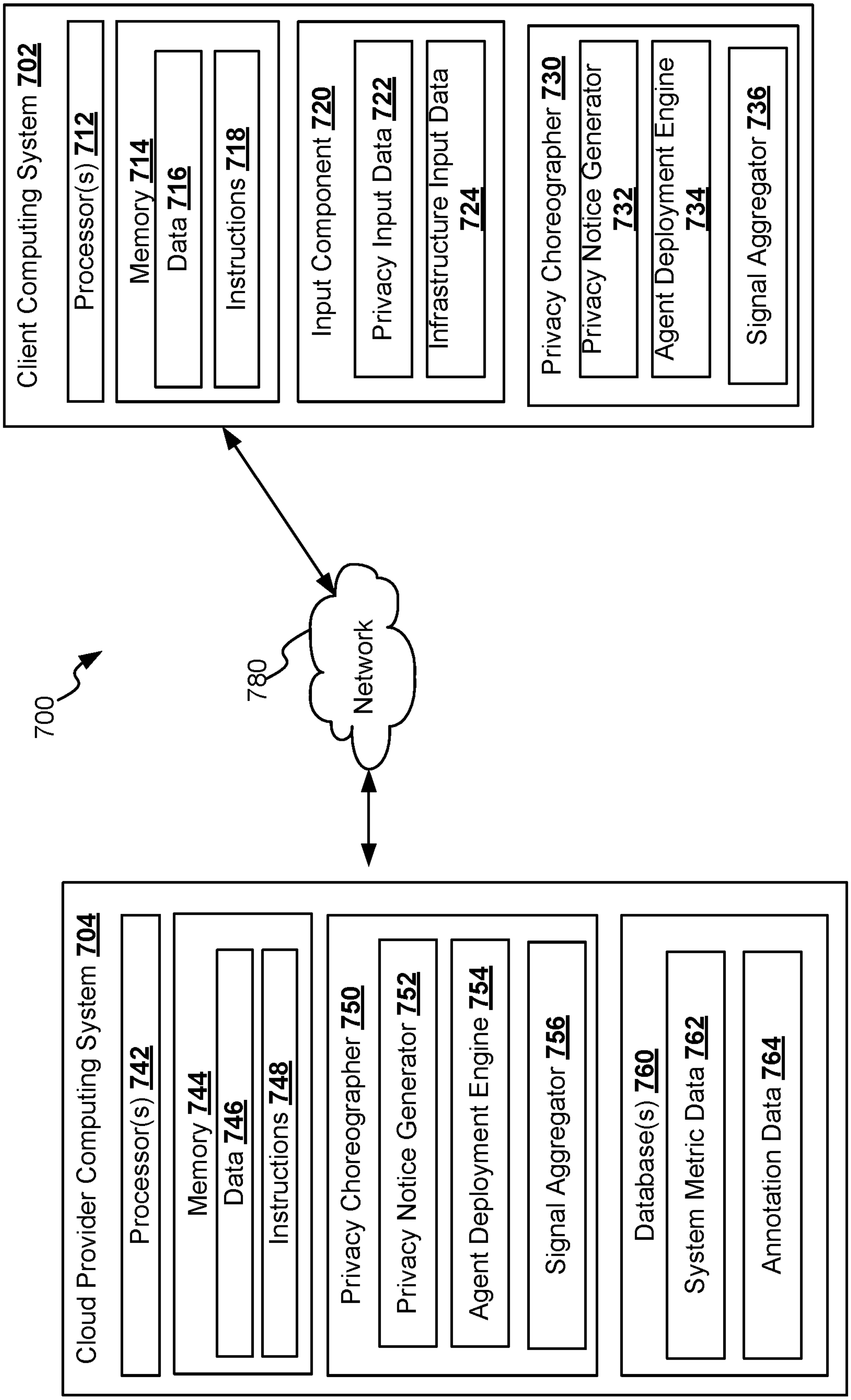
FIG. 7A depicts a block diagram of an example system for monitoring privacy state and/or deploying infrastructure according to example embodiments of the present disclosure.

FIG. 7A illustrates one example computing system that can be used to implement the present disclosure. Other computing systems can be used as well. For example, in some implementations, the client computing system 702 can include the model trainer and/or the training data. In such implementations, the models can be both trained and/or used locally at the client computing system 702. In some of such implementations, the client computing system 702 can implement the model trainer to personalize the models based on user-specific data.

Figure 7B:
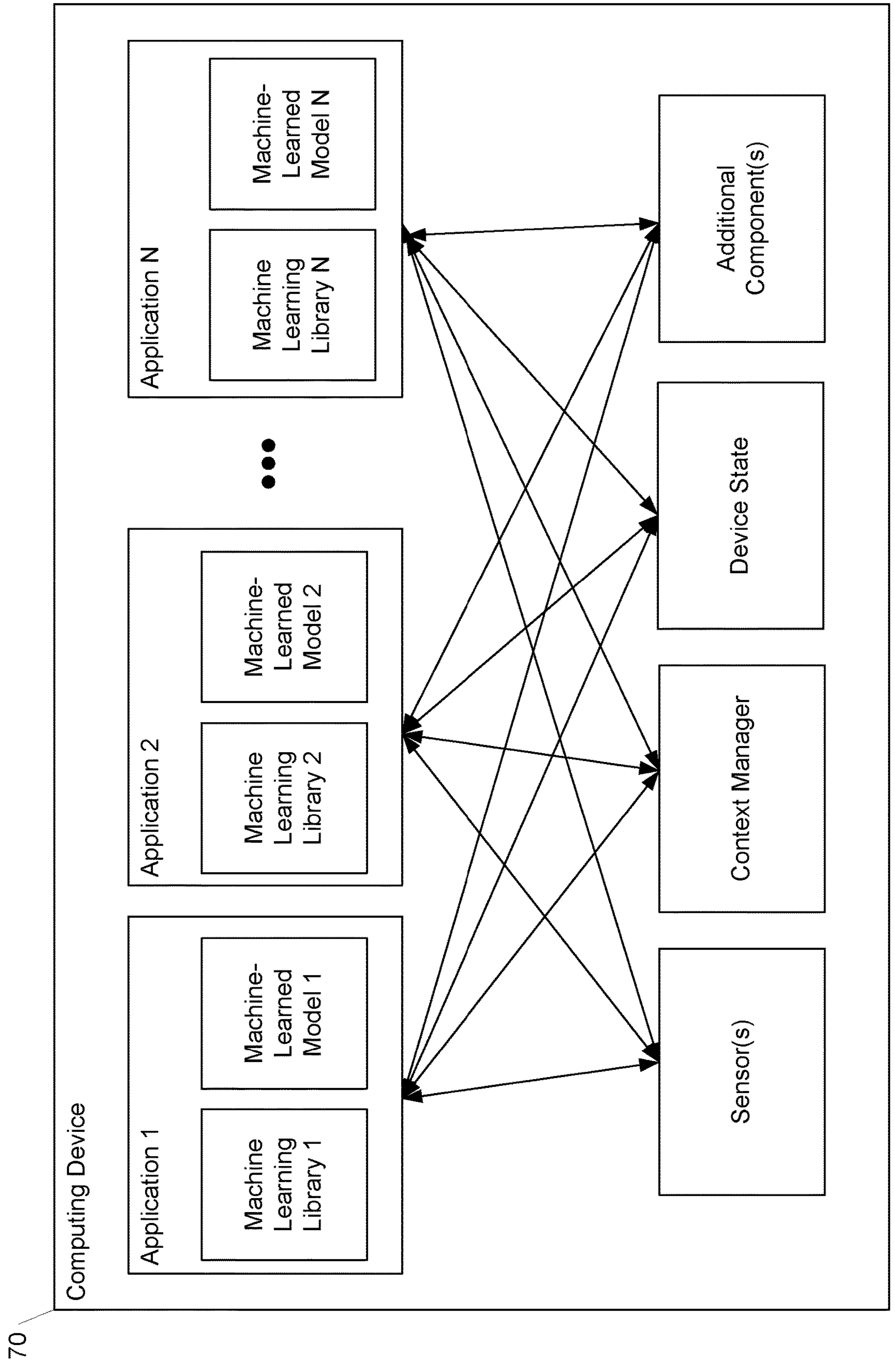
FIG. 7B depicts a block diagram of an example system for monitoring privacy state and/or deploying infrastructure according to example embodiments of the present disclosure.

FIG. 7B depicts a block diagram of an example computing device 70 that determines proactive privacy execution actions based on context data associated with a user device according to example embodiments of the present disclosure. The computing device 70 can be a user computing device and/or a server computing device.

The computing device 70 includes a number of applications (e.g., applications 7 through N). Each application contains its own machine learning library and/or machine-learned model(s). For example, each application can include a machine-learned model. Example applications include a navigation application, a calendar application, a camera application, a text messaging application, an email application, a dictation application, a virtual keyboard application, a browser application, etc.

As illustrated in FIG. 7B, each application can communicate with a number of other components of the computing device, such as, for example, a number of sensors, a context manager, a device state component, and/or additional components. In some implementations, each application can communicate with each device component using an API (e.g., a public API). In some implementations, the API used by each application is specific to that application.

Figure 7C:
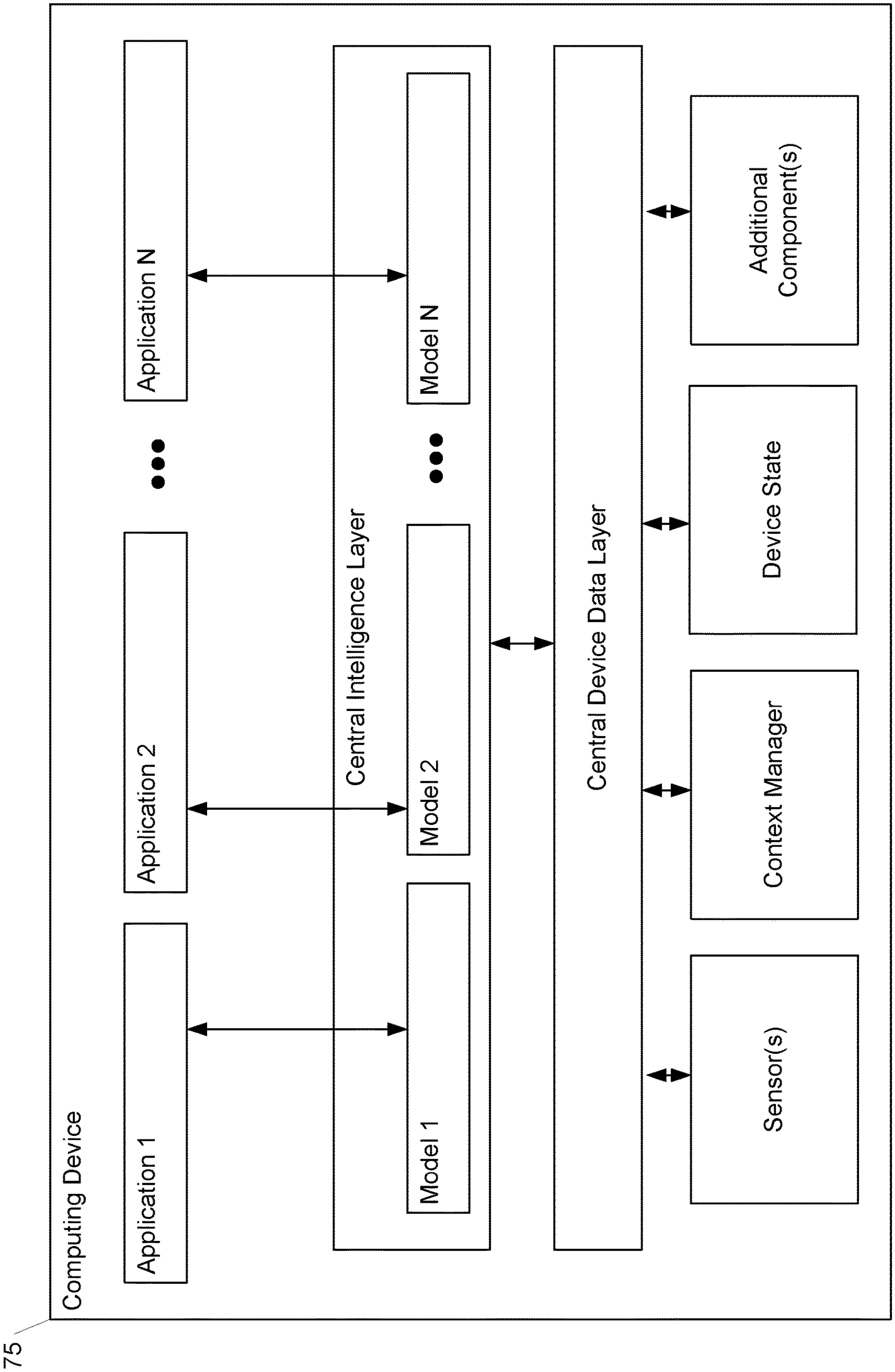
FIG. 7C depicts a block diagram of an example system for monitoring privacy state and/or deploying infrastructure according to example embodiments of the present disclosure.

FIG. 7C depicts a block diagram of an example computing device 75 that determines proactive privacy execution actions based on context data associated with a user device according to example embodiments of the present disclosure. The computing device 75 can be a user computing device and/or a server computing device.

The computing device 75 includes a number of applications (e.g., applications 1 through N). Each application is in communication with a central intelligence layer. Example applications include a navigation application, a calendar application, a camera application, a text messaging application, an email application, a dictation application, a virtual keyboard application, a browser application, etc. In some implementations, each application can communicate with the central intelligence layer (and model(s) stored therein) using an API (e.g., a common API across all applications).

The central intelligence layer includes a number of machine-learned models. For example, as illustrated in FIG. 7C, a respective machine-learned model can be provided for each application and/or managed by the central intelligence layer. In other implementations, two and/or more applications can share a single machine-learned model. For example, in some implementations, the central intelligence layer can provide a single model for all of the applications. In some implementations, the central intelligence layer is included within and/or otherwise implemented by an operating system of the computing device 75.

The central intelligence layer can communicate with a central device data layer. The central device data layer can be a centralized repository of data for the computing device 75. As illustrated in FIG. 7C, the central device data layer can communicate with a number of other components of the computing device, such as, for example, a number of sensors, a context manager, a device state component, and/or additional components. In some implementations, the central device data layer can communicate with each device component using an API (e.g., a private API).

The technology discussed herein makes reference to servers, databases, software applications, and/or other computer-based systems, as well as actions taken and/or information sent to and/or from such systems. The inherent flexibility of computer-based systems allows for a great variety of possible configurations, combinations, and/or divisions of tasks and/or functionality between and/or among components. For instance, processes discussed herein can be implemented using a single device and/or component and/or multiple devices and/or components working in combination. Databases and/or applications can be implemented on a single system and/or distributed across multiple systems. Distributed components can operate sequentially and/or in parallel.

While the present subject matter has been described in detail with respect to various specific example embodiments thereof, each example is provided by way of explanation, not limitation of the disclosure. Those skilled in the art, upon attaining an understanding of the foregoing, can readily produce alterations to, variations of, and/or equivalents to such embodiments. Accordingly, the subject disclosure does not preclude inclusion of such modifications, variations and/or additions to the present subject matter as would be readily apparent to one of ordinary skill in the art. For instance, features illustrated and/or described as part of one embodiment can be used with another embodiment to yield a still further embodiment. Thus, it is intended that the present disclosure cover such alterations, variations, and/or equivalents.

The depicted and/or described steps are merely illustrative and/or can be omitted, combined, and/or performed in an order other than that depicted and/or described; the numbering of depicted steps is merely for ease of reference and/or does not imply any particular ordering is necessary and/or preferred.

The functions and/or steps described herein can be embodied in computer-usable data and/or computer-executable instructions, executed by one or more computers and/or other devices to perform one or more functions described herein. Generally, such data and/or instructions include routines, programs, objects, components, data structures, and/or the like that perform particular tasks and/or implement particular data types when executed by one or more processors in a computer and/or other data-processing device. The computer-executable instructions can be stored on a computer-readable medium such as a hard disk, optical disk, removable storage media, solid-state memory, read-only memory (ROM), random-access memory (RAM), and/or the like. As will be appreciated, the functionality of such instructions can be combined and/or distributed as desired. In addition, the functionality can be embodied in whole and/or in part in firmware and/or hardware equivalents, such as integrated circuits, application-specific integrated circuits (ASICs), field-programmable gate arrays (FPGAs), and/or the like. Particular data structures can be used to implement one or more aspects of the disclosure more effectively, and/or such data structures are contemplated to be within the scope of computer-executable instructions and/or computer-usable data described herein.

Although not required, one of ordinary skill in the art will appreciate that various aspects described herein can be embodied as a method, system, apparatus, and/or one or more computer-readable media storing computer-executable instructions. Accordingly, aspects can take the form of an entirely hardware embodiment, an entirely software embodiment, an entirely firmware embodiment, and/or an embodiment combining software, hardware, and/or firmware aspects in any combination.

As described herein, the various methods and/or acts can be operative across one or more computing devices and/or networks. The functionality can be distributed in any manner and/or can be located in a single computing device (e.g., server, client computer, user device, and/or the like).

Aspects of the disclosure have been described in terms of illustrative embodiments thereof. Numerous other embodiments, modifications, and/or variations within the scope and/or spirit of the appended claims can occur to persons of ordinary skill in the art from a review of this disclosure. For example, one and/or ordinary skill in the art can appreciate that the steps depicted and/or described can be performed in other than the recited order and/or that one or more illustrated steps can be optional and/or combined. Any and/or all features in the following claims can be combined and/or rearranged in any way possible.

Aspects of the disclosure have been described in terms of illustrative embodiments thereof. Numerous other embodiments, modifications, and/or variations within the scope and/or spirit of the appended claims can occur to persons of ordinary skill in the art from a review of this disclosure. Any and/or all features in the following claims can be combined and/or rearranged in any way possible. Accordingly, the scope of the present disclosure is by way of example rather than by way of limitation, and/or the subject disclosure does not preclude inclusion of such modifications, variations and/or additions to the present subject matter as would be readily apparent to one of ordinary skill in the art. Moreover, terms are described herein using lists of example elements joined by conjunctions such as "and," "or," "but," etc. It should be understood that such conjunctions are provided for explanatory purposes only. Lists joined by a particular conjunction such as "or," for example, can refer to "at least one of" and/or "any combination of" example elements listed therein, with "or" being understood as "and/or" unless otherwise indicated. Also, terms such as "based on" should be understood as "based at least in part on."

While the present subject matter has been described in detail with respect to various specific example embodiments thereof, each example is provided by way of explanation, not limitation of the disclosure. Those skilled in the art, upon attaining an understanding of the foregoing, can readily produce alterations to, variations of, and/or equivalents to such embodiments. Accordingly, the subject disclosure does not preclude inclusion of such modifications, variations, and/or additions to the present subject matter as would be readily apparent to one of ordinary skill in the art. For instance, features illustrated and/or described as part of one embodiment can be used with another embodiment to yield a still further embodiment. Thus, it is intended that the present disclosure covers such alterations, variations, and/or equivalents.

What is claimed is:

1. A computing system, the computing system comprising:

one or more processors; and one or more computer-readable media storing instructions that are executable to cause the one or more processors to perform operations, the operations comprising:

deploying a plurality of privacy agents including at least a first privacy agent and a second privacy agent;

receiving, from the plurality of privacy agents, system metric data comprising compute metrics associated with a plurality of compute resources comprising at least a first compute resource located in a first geographic region and a second compute resource located in a second geographic region, wherein the compute metrics are based on at least one of settings and functions of the first compute resource and the second compute resource;

comparing the system metric data to current privacy state requirements that are based on organizational privacy settings, wherein the current privacy state requirements comprise a first set of requirements associated with the first geographic region and a second set of requirements associated with the second geographic region;

generating a real-time risk profile for the computing system by comparing the system metric data to the current privacy state requirements to determine that at least the first compute resource is not in compliance with the first set of requirements;

based on the real-time risk profile, generating a configuration file to spin up a new compute resource that is in compliance with the current privacy state requirements; and executing the configuration file to spin up the new compute resource to maintain compliance with the current privacy state requirements.

2. The computing system of claim 1, wherein the system metric data comprises at least one of application metrics, resource utilization metrics, and logging metrics.

3. The computing system of claim 1, wherein generating the risk profile comprises:

generating mapped log data based on the system metric data by:

obtaining the system metric data from the plurality of privacy agents, wherein the system metric data comprises at least one annotation;

indexing the system metric data based on the at least one annotation;

processing, using at least one privacy data model, the log data; and mapping data by correlating groups of data based on at least one privacy related attribute.

4. The computing system of claim 1, wherein the plurality of privacy agents are application programming interfaces installed in at least one of (i) a cloud computing environment, (ii) a multi cloud computing environment, and (iii) an on-prem environment.

5. The computing system of claim 1, wherein the current privacy state requirements are based on data comprising at least one of: onboard sub processors, legal agreements, privacy standards, organizational privacy settings and preferences, and explicit lists of allowed or denied entities.

6. The computing system of claim 1, wherein the operations further comprise executing the configuration file to deploy infrastructure comprising at least one of central processing units, storage, technical support tool, asset inventory, and logging.

7. A computer-implemented method comprising:

deploying a plurality of privacy agents including at least a first privacy agent and a second privacy agent;

receiving, from the plurality of privacy agents, system metric data comprising compute metrics associated with a plurality of compute resources comprising at least a first compute resource located in a first geographic region and a second compute resource located in a second geographic region, wherein the compute metrics are based on at least one of settings and functions of the first compute resource and the second compute resource;

comparing the system metric data to current privacy state requirements that are based on organizational privacy settings, wherein the current privacy state requirements comprise a first set of requirements associated with the first geographic region and a second set of requirements associated with the second geographic region;

generating, by a computing system, a real-time risk profile for the computing system by comparing the system metric data to current privacy state requirements to determine that at least the first compute resource is not in compliance with the first set of requirements;

based on the real-time risk profile, generating a configuration file to spin up a new compute resource that is in compliance with the current privacy state requirements; and executing the configuration file to spin up the new compute resource to maintain compliance with the current privacy state requirements.

8. The computer-implemented method of claim 7, wherein the system metric data comprises at least one of application metrics, resource utilization metrics, and logging metrics.

9. The computer-implemented method of claim 7, wherein generating the risk profile comprises:

generating mapped log data based on the system metric data by:

obtaining the system metric data from the plurality of privacy agents, wherein the system metric data comprises at least one annotation;

indexing the system metric data based on the at least one annotation;

processing, using at least one privacy data model, the log data; and mapping data by correlating groups of data based on at least one privacy related attribute.

10. The computer-implemented method of claim 7, wherein the plurality of privacy agents are application programming interfaces installed in at least one of (i) a cloud computing environment, (ii) a multi cloud computing environment, and (iii) an on-prem environment.

11. The computer-implemented method of claim 7, wherein the current privacy state requirements are based on data comprising at least one of: onboard sub processors, legal agreements, privacy standards, organizational privacy settings and preferences, explicit lists of allowed or denied entities.

12. The computer-implemented method of claim 7, wherein the method further comprises executing the configuration file to deploy infrastructure comprising at least one of central processing units, storage, technical support tool, asset inventory, and logging.

13. One or more non-transitory computer-readable media storing instructions that are executable by one or more processors to perform operations comprising:

obtaining privacy input data;

generating, by a computing system, a first configuration file based on the privacy input data;

deploying plurality of privacy agents comprising at least a first privacy agent and a second privacy agent by reading and executing the configuration file;

monitoring a first compute resource located in a first geographic location by the first privacy agent and second compute resource located in a second geographic location by the second privacy agent, wherein the first compute resource and the second compute resource are associated with the system, and wherein the monitoring comprises:

obtaining system metric data associated with the first compute resource from the first privacy agent and the second compute resource from the second privacy agent; and aggregating the system metric data;

generating, based on the aggregated system metric data, a real-time risk profile for the computing system by comparing the system metric data to current privacy state requirements, wherein the current privacy state requirements comprise geographically specific resourcing requirements associated with the first geographic location and the second geographic location;

based on the real-time risk profile generating a second configuration file to spin up a new compute resource that is in compliance with the current privacy state requirements; and executing the second configuration file to spin up the new compute resource to maintain compliance with the current privacy state requirements.

14. The one or more non-transitory computer-readable media of claim 13, wherein the system metric data comprises at least one of application metrics, resource utilization metrics, and logging metrics.

15. The one or more non-transitory computer-readable media of claim 13, wherein aggregating the system metric data comprises:

obtaining, by the computing system, the system metric data from the first privacy agent and the second privacy agent, wherein the system metric data comprises at least one annotation;

indexing, by the computing system, the system metric data based on the at least one annotation;

processing, by the computing system, using at least one privacy data models, log data; and mapping, by the computing system, data by correlating groups of data based on at least one privacy related attribute.

* * * * *